(12) United States Patent
Thirumaleshwara et al.

(10) Patent No.: US 9,298,988 B2
(45) Date of Patent: Mar. 29, 2016

(54) SUPPORT VECTOR MACHINE BASED OBJECT DETECTION SYSTEM AND ASSOCIATED METHOD

(71) Applicant: ANALOG DEVICES TECHNOLOGY, Hamilton (BM)

(72) Inventors: Prasanna Baja Thirumaleshwara, Kasargod (IN); Vijaykumar Nagarajan, Bangalore (IN)

(73) Assignee: ANALOG DEVICES GLOBAL, Hamilton (BM)

( * ) Notice: Subject to any disclaimer, the term of this patent is extended or adjusted under 35 U.S.C. 154(b) by 24 days.

(21) Appl. No.: 14/076,030

(22) Filed: Nov. 8, 2013

(65) Prior Publication Data
US 2015/0131848 A1    May 14, 2015

(51) Int. Cl.
| | |
|---|---|
| *G06K 9/00* | (2006.01) |
| *G06K 9/46* | (2006.01) |
| *G06K 9/62* | (2006.01) |
| *G06T 11/60* | (2006.01) |

(52) U.S. Cl.
CPC .......... *G06K 9/00624* (2013.01); *G06K 9/4604* (2013.01); *G06K 9/4642* (2013.01); *G06K 9/6267* (2013.01); *G06T 11/60* (2013.01)

(58) Field of Classification Search
None
See application file for complete search history.

(56) References Cited

U.S. PATENT DOCUMENTS

| 7,139,411 B2 | 11/2006 | Fujimura et al. |
| 7,336,803 B2 * | 2/2008 | Mittal et al. .................. 382/103 |
| 2008/0063285 A1 * | 3/2008 | Porikli et al. ................. 382/190 |
| 2012/0027252 A1 | 2/2012 | Liu et al. |
| 2014/0133698 A1 * | 5/2014 | Fernandez et al. ............ 382/103 |

FOREIGN PATENT DOCUMENTS

| WO | 2008/138802 | 11/2008 |
| WO | 2009/026965 | 3/2009 |
| WO | 2009/149236 | 12/2009 |

OTHER PUBLICATIONS

International Search Report, Written Opinion for PCT/US2014/064684 mailed Feb. 25, 2015, 9 pages.

(Continued)

*Primary Examiner* — Shefali Goradia
(74) *Attorney, Agent, or Firm* — Patent Capital Group

(57) ABSTRACT

An exemplary object detection method includes generating feature block components representing an image frame, and analyzing the image frame using the feature block components. For each feature block row of the image frame, feature block components associated with the feature block row are evaluated to determine a partial vector dot product for detector windows that overlap a portion of the image frame including the feature block row, such that each detector window has an associated group of partial vector dot products. The method can include determining a vector dot product associated with each detector window based on the associated group of partial vector dot products, and classifying an image frame portion corresponding with each detector window as an object or non-object based on the vector dot product. Each feature block component can be moved from external memory to internal memory once implementing the exemplary object detection method.

23 Claims, 5 Drawing Sheets

(56) References Cited

OTHER PUBLICATIONS

Kyrkou, C. et al., "An Embedded Hardware-Efficient Architecture for Real-Time Cascade Support Vector Machine Classification", 2013 International Conference on Agios Konstantinos, Jul. 15-18, 2013, http://ieeexplore.ieee.org/xpls/abs_all.jsp?arnumber=6621115, 978-1-4799-0103-6/13 © 2013 IEEE, pp. 129-136.

Catanzaro, Brian et al., "Fast Support Vector Machine Training and Classification on Graphics Processors", © 2008, ICML 2008 Proceedings of the $25^{th}$ International Conference on Machine Learning, Jul. 5-9, 2008, http://da.acm.org/citation.cfm?id=1390170, pp. 104-111.

Navneet Dalah et al., "Histograms of Oriented Gradients for Human Detection," INRIA Rhône-Alps, 655 avenue de l'Europe, Montbonnot 38334, France, http://lear.inrialpes.fr, pp. 1-8.

* cited by examiner

SUPPORT VECTOR MACHINE BASED OBJECT DETECTION SYSTEM AND ASSOCIATED METHOD

TECHNICAL FIELD

The present disclosure relates generally to object detection systems and associated methods, and more particularly, to support vector machine (SVM) based object detection systems and associated methods.

BACKGROUND

Object detection systems and methods, such as pedestrian detection systems and methods, can be implemented in automatic driver assistance systems to provide lane detection, obstacle detection, traffic sign recognition, pedestrian detection, and/or other types of detection. Such object detection systems and methods often implement support vector machine (SVM) classifiers to assist with classifying analyzed images into an object class or non-object class. Today's SVM-based object detection systems and methods tend to be computationally intensive, requiring significant data bandwidth that present challenges for real-time implementation. Accordingly, although existing SVM-based object detection systems and associated methods have been generally adequate for their intended purposes, they have not been entirely satisfactory in all respects.

BRIEF DESCRIPTION OF DRAWINGS

The present disclosure is best understood from the following detailed description when read with the accompanying figures. It is emphasized that, in accordance with the standard practice in the industry, various features are not drawn to scale and are used for illustration purposes only. In fact, the dimension of the various features may be arbitrarily increased or reduced for clarity of discussion.

OVERVIEW OF EXAMPLE EMBODIMENTS

Figure 1:
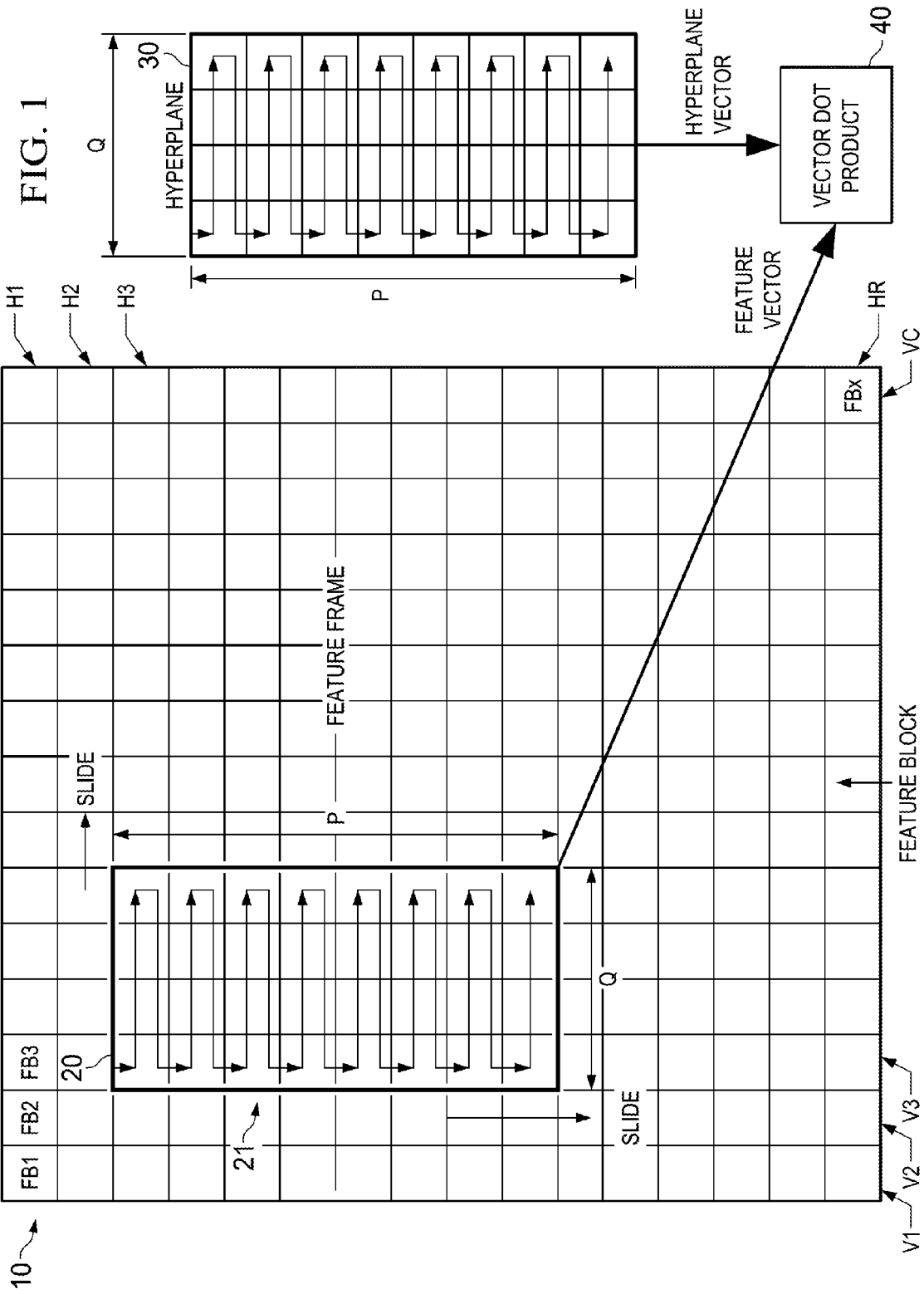
FIG. 1 illustrates an exemplary methodology for detecting an object in an image frame according to various aspects of the present disclosure.

An exemplary object detection method includes generating feature block components representing an image frame, and analyzing the image frame using the feature block components. For each feature block row of the image frame, feature block components associated with the feature block row are evaluated to determine a partial vector dot product for detector windows that overlap a portion of the image frame including the feature block row, such that each detector window has an associated group of partial vector dot products. The method can include determining a vector dot product associated with each detector window based on the associated group of partial vector dot products, and classifying an image frame portion corresponding with each detector window as an object or non-object based on the vector dot product. Each feature block component can be moved from external memory to internal memory once implementing the exemplary object detection method. In various implementations, an apparatus includes a processor coupled to an internal memory and an external memory, wherein the processor includes an object detection module configured to perform an object detection and classification process that minimizes data transfer between the internal memory and external memory. The object detection module can be configured to perform the exemplary object detection method.

DETAILED DESCRIPTION OF EXAMPLE EMBODIMENTS

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed.

FIG. 1 illustrates an exemplary methodology for detecting an object in an image frame 10 according to various aspects of the present disclosure. In various implementations, the exemplary methodology detects a pedestrian in the image frame 10. FIG. 1 has been simplified for the sake of clarity to better understand the inventive concepts of the present disclosure. Additional features can be added to the exemplary methodology and associated image frame 10, and some of the features described below can be replaced or eliminated in other embodiments of the exemplary methodology and associated image frame 10.

In FIG. 1, image frame 10 is partitioned into feature blocks FB1, FB2, FB3, . . . FBx, where x is a total number of feature blocks of image frame 10. Feature blocks FB1, FB2, FB3, . . . FBx can be grouped into feature block rows (groups of feature blocks in a horizontal direction of image frame 10) and feature block columns (groups of feature blocks in a vertical direction of image frame 10). For example, in the depicted embodiment, image frame 10 includes feature block rows H1, H2, H3, . . . HR and feature block columns V1, V2, V3, . . . VC, where R is a total number of feature block rows of image frame 10 and C is a total number of feature block columns of image frame 10. Each feature block row H1, H2, H3, . . . HR includes a number of feature blocks, N, in the horizontal direction of image frame 10; and each feature block column V1, V2, V3, . . . VC includes a number of feature blocks, M, in the vertical direction of image frame 10.

Each feature block FB1, FB2, FB3, . . . FBx has an associated feature block component, such as an associated histogram of oriented gradient (HOG) feature block component. For example, in various implementations, image frame 10 can be partitioned into cells (various spatial regions of image frame 10), where each cell includes one or more pixels of image frame 10. Each pixel has an edge (gradient) intensity value and an edge angle (orientation) value. For each cell, an edge intensity weighted edge angle histogram can be determined by accumulating edge intensity values for each edge angle bin. Such a histogram provides HOG descriptors for the cell. The cells can then be grouped into blocks (here, feature blocks FB1, FB2, FB3, . . . FBx), where each cell can form a portion of more than one block. For each block, a measure of intensity ("energy") can be accumulated over the cells within the block and used to normalize the HOG feature descriptors of each of the cells within the block, such that the block has an associated HOG feature block component. In various implementations, the associated HOG feature block component can thus include a vector of HOG feature descriptors of normalized cell histograms for the cells within the block.

Using the HOG feature block components, image frame 10 can be analyzed to detect objects in image frame 10. For example, a detector window can be defined and aligned with a portion of image frame 10, such that the detector window overlaps (spans) the portion of image frame 10; and HOG feature block components corresponding with the portion of image frame 10 overlapped by the detector window can be evaluated to identify an object in the portion of the image frame 10. The detector window can be moved to various locations within image frame 10 to evaluate various portions of image frame 10 for object detection. In various implementations, the detector window can be moved both vertically and horizontally within image frame 10 to evaluate a region of interest of image frame 10, which may include all of image frame 10 or selected portions of image frame 10. In various implementations, image frame 10 can be evaluated using detector windows having various sizes—a number of detector window scales, L. For example, in some embodiments, three detector window scales (L=3) can be applied to image frame 10 to detect objects, such as a first detector window having a 48×80 pixel size, a second detector window having a 64×128 pixel size, and a third detector window having a 80×160 pixel size. Evaluating image frame 10 with detector windows having different sizes can enhance object detection reliability.

In FIG. 1, a detector window 20 overlaps a portion 21 of image frame 10, and thus, a portion of feature blocks FB1, FB2, FB3, . . . FBx that correspond with the image frame portion 21. In particular, detector window 20 overlaps a number of feature block rows, P, and a number of feature block columns, Q. For example, detector window 20 overlaps eight feature block rows (P=8) and four feature block columns (Q=4). At each position within image frame 10, detector window 20 (and more particularly, the image portion overlapped by detector window 20) has an associated HOG feature vector, which is represented by HOG feature block components of the feature blocks corresponding with the image portion overlapped by detector window 20. For example, in the depicted embodiment, detector window 20 has an associated HOG feature vector represented by HOG feature block components of the feature blocks corresponding with image portion 21 overlapped by detector window 20. Put another way, at each position, the HOG feature vector associated with detector window 20 can be formed by grouping normalized cell histograms (the HOG descriptors) of the feature blocks overlapped by detector window 20.

A classifier can evaluate and classify the HOG feature vector as positive (indicating that the HOG feature vector represents an object) or negative (indicating that the HOG feature vector does not represent an object), thereby providing an object/non-object classification for the portion of image frame 10 overlapped by (corresponding with) detector window 20. In various implementations, the classifier is a support vector machine (SVM) classifier, such as a linear SVM, that can be trained to detect objects for various sizes of detector windows. For example, SVM classifier can be a binary classifier that uses training data to construct a hyperplane for optimally separating HOG feature vectors into two categories—here, object or non-object. In various implementations, SVM classifier is trained with an image set divided into pedestrian class images and non-pedestrian class images, where SVM classifier has further been trained to classify images using different sizes of detector windows.

In the depicted embodiment, SVM classifier constructs a hyperplane 30 that can be used to identify HOG feature vectors associated with detector window 20 (and thus HOG feature vectors representing images in image frame 10) as falling within the object (pedestrian) class or non-object (non-pedestrian) class. Hyperplane 30 has a size that corresponds with a size of the detector window being used for object detection and classification. For example, here, hyperplane 30 also spans a number of feature block rows, P, and a number of feature block columns, Q. SVM classifier combines the HOG feature vector associated with detector window 20 with hyperplane 30 (in other words, a weighted sum of HOG feature descriptors) using a vector dot product 40, and then evaluates vector dot product 40 to classify the HOG feature vector (and thus corresponding image portion 21) as object or non-object. Such classification process can be performed for HOG feature vectors associated with detector window 20 at various positions within image frame 10, such that various portions of image frame 10 can be classified as object or non-object.

Typically, when implementing the exemplary methodology depicted in FIG. 1, all HOG feature block components that correspond with image frame 10 (here, HOG feature block components associated with feature blocks FB1, FB2, FB3, . . . FBx) cannot be placed in internal memory for the object detection and classification process. Accordingly, the HOG feature block components are placed in external memory, and as a detector window is moved within image frame 10, for each position of the detector window within image frame 10, an associated HOG feature vector (and thus associated HOG feature block components) is moved from external memory to internal memory for classification. For example, once detector window 20 is moved to the position spanning image portion 21 as depicted in FIG. 1, HOG feature block components that correspond with image portion 21 and thus form the associated HOG feature vector are moved from external memory to internal memory, where the associated HOG feature vector is then combined with hyperplane 30 to determine the vector dot product 40, and thereby classify the associated HOG feature vector (and thus portion of image frame 10 that corresponds with detector window 20) as an object or non-object. Such feature block component (data) movement from external memory to internal memory is implemented for each position of detector window 20 within image frame 10, and similarly for each position of other detector windows used to evaluate image frame 10.

Figure 2:
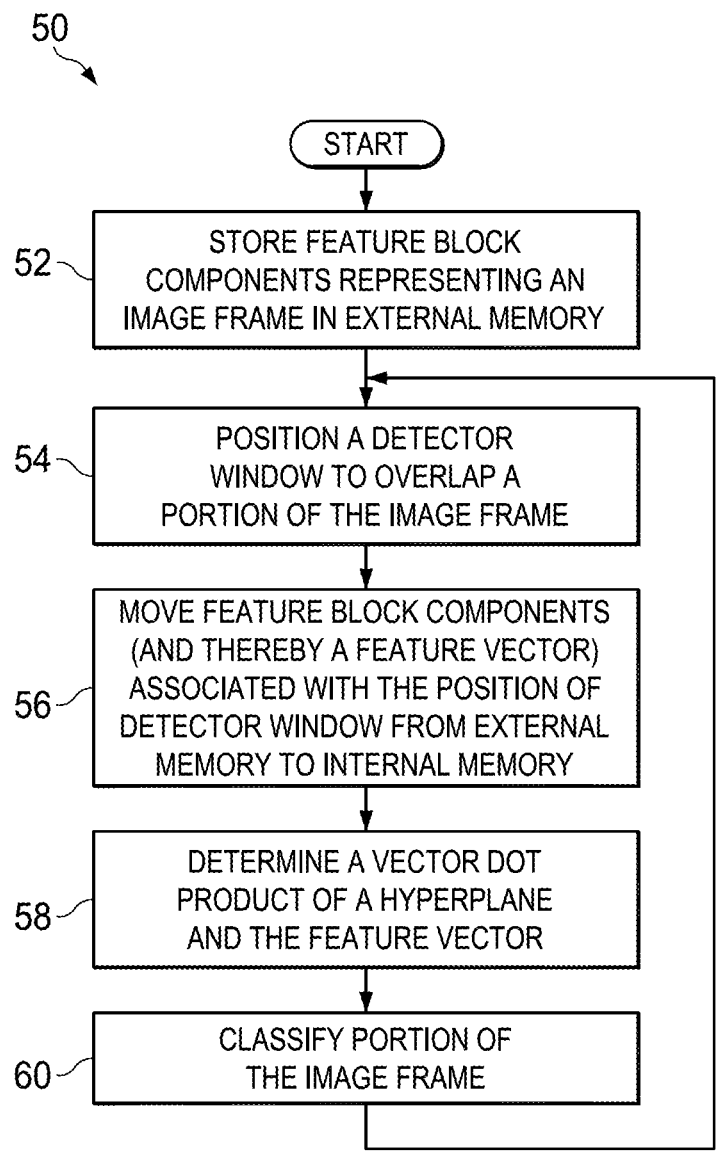
FIG. 2 is a flowchart of an exemplary method for detecting objects in an image frame, such as that associated with the exemplary methodology depicted in and described with reference to FIG. 1, according to various aspects of the present disclosure.

FIG. 2 is a flowchart of an exemplary method 50 for detecting objects in an image frame, such as that associated with the exemplary methodology depicted in and described with reference to FIG. 1, according to various aspects of the present disclosure. The method 50 begins at block 52 by storing feature block components that represent (correspond with) an image frame in external memory. For example, referring to FIG. 1 and corresponding description, image frame 10 can be analyzed to define feature block components, such as HOG feature block components, that represent image frame 10. The HOG feature block components, which can be used to classify portions of image frame 10 during subsequent processing, can be stored in an external memory. At block 54, a detector window is positioned to overlap (span) a portion of the image frame. For example, referring to FIG. 1, detector window 20 overlaps portion 21 of image frame 10. At block 56, a feature vector associated with the detector window is moved from external memory to internal memory. For example, referring to FIG. 1, an HOG feature vector associated with the position of detector window 20 within image frame 10 is moved from external memory to internal memory. In other words, a group of HOG feature block components that correspond with image portion 21 overlapped by detector window 20 are moved from external memory to internal memory. At block 58, method 50 proceeds to determine a vector dot product of a hyperplane and the feature vector. For example, referring to FIG. 1, the HOG feature vector associated with detector window 20 (as positioned in image frame 10) is combined with hyperplane 30 to determine vector dot product 40. At block 60, the portion of the image frame is classified, in various implementations, into one of two categories. For example, referring to FIG. 1, image frame portion 21 overlapped by detector window 20 is classified as object or non-object based on vector dot product 40. Step 54 through step 60 can be repeated until the detector window has been positioned to overlap various portions of the image frame. For example, in various implementations, step 54 through step 60 is repeated until detector window 20 has covered an entirety of image frame 10. The present disclosure also contemplates implementations where selected portions of image frame 10 are evaluated, instead of the entire image frame 10. Further, where various detector window scales are implemented, step 54 through step 60 can be repeated for detector windows of each detector window scale. Additional steps can be provided before, during, and after the method 50 and some of the steps described can be replaced or eliminated for other embodiments of the method 50.

The object classification process implementation described with reference to FIG. 1 and FIG. 2 exchanges significant data amounts between internal memory and external memory by moving data associated with each detector window (in the depicted embodiment, feature block components (a feature vector) associated with detector window 20 at each position within image frame 10, and for every other detector window used to analyze image frame 10), such that total bandwidth consumed for the object classification process is undesirably large, particularly for real-time implementations. For example, a total data bandwidth (Bt) used by the object classification process implementation described with reference to FIG. 1 and FIG. 2 can be represented by Equation (1):

$$Bt = Bf \times Fr$$

where Bf is a bandwidth per frame for all detector window scales used to evaluate an image frame and Fr is a frame rate. In various implementations, the bandwidth per frame for all detector window scales can be represented by Equation (2):

$$Bf = Sb \times \sum_{i=0}^{i=L-1} (P_i \times Q_i) \times (M - P_i + 1) \times (N - Q_i + 1)$$

where Sb is a size of a feature block in words, L is a number of detector window scales used to analyze the image frame, N is a number of feature blocks in a horizontal direction of the image frame (for example, a number of feature blocks in each feature block row of the image frame), M is a number of feature blocks in a vertical direction of the image frame (for example, a number of feature blocks in each feature block column of the image frame), $P_i$ is a number of feature block rows in a detector window of $i^{th}$ scale, and $Q_i$ is a number of feature block columns in the detector window of $i^{th}$ scale. It is noted that a feature size for a detector window for an $i^{th}$ scale can be represented by Equation (3):

Feature Size for Detector Window for $i^{th}$ Scale=$Sb \times P_i \times Q_i$;

a number of detector windows for the $i^{th}$ scale can be represented by Equation (4):

Number of Detector Windows for $i^{th}$ Scale=$(M-P_i+1) \times (N-Q_i+1)$; and a bandwidth for the $i^{th}$ scale can be represented by Equation (5):

Bandwidth for $i^{th}$ Scale=$(Sb \times P_i \times Q_i) \times (M-P_i+1) \times (N-Q_i+1)$.

Accordingly, in an exemplary typical object classification case, where:

an image frame is partitioned into 79 feature blocks in a horizontal direction (N=79) and 44 feature blocks in a vertical direction (M=44) (such that each feature block row includes 79 feature blocks and each feature block column includes 44 feature blocks), three detector windows having different sizes are applied to the image frame for object classification (L=number of scales=3):

Detector Window 1 ($i$=0)=($P_0,Q_0$)=(9,5)

Detector Window 2 ($i$=1)=($P_1,Q_1$)=(15,7)

Detector Window 3 ($i$=2)=($P_2,Q_2$)=(19,9)

(at each position, Detector Window 1 spans 9 feature block rows ($P_0$=9) and 5 feature block columns ($Q_0$=5), Detector Window 2 spans 15 feature block rows ($P_1$=15) and 7 feature block columns ($Q_1$=7), and Detector Window 3 spans 19 feature block rows ($P_2$=19) and 9 feature block columns ($Q_2$=9)), a size of each feature block is 32 words (Sb=32), and images can be processed for object classification at 30 frames per second (frame rate=Fr=30), the following bandwidth figures can be achieved:

Bandwidth Detector Window Scale 0 ($i$=0)($BDW2$)= 3.888 M Words=$(Sb \times P_0 \times Q_0) \times (M-P_0+1) \times (N-Q_0+1)$=$(32 \times 9 \times 5) \times (44-9+1) \times (79-5+1)$ Bandwidth Detector Window Scale 1 ($i$=1)($BDW1$)= 7.358 M Words=$(Sb \times P_1 \times Q_1) \times (M-P_1+1) \times (N-Q_1+1)$=$(32 \times 15 \times 7) \times (44-15+1) \times (79-7+1)$ Bandwidth Detector Window Scale 2 ($i$=2)($BDW2$)= 10.101 M Words=$(Sb \times P_2 \times Q_2) \times (M-P_2+1) \times (N-Q_2+1)$=$(32 \times 19 \times 9) \times (44-19+1) \times (79-9+1)$ Total Bandwidth Per Frame ($Bf$)=21.34 M Words=$BDW0+BDW1+BDW2$=3.888 M Words+ 7.358 M Words+10.101 M Words Total Bandwidth ($Bt$)=640.41 M Words=$Bf \times Fr$=21.347$\times$30

Such bandwidth figures are undesirably large for object detection and classification processes, particularly for real-time object detection and classification. In fact, in some situations, these bandwidth figures are not acceptable for real-time implementations.

As evident from FIG. 1 and FIG. 2, since each feature block FB1, FB2, FB3, ... FBx is overlapped by more than one detector window during the object detection and classification process, a lot of data redundancy occurs in either direction (horizontally and vertically). More specifically, as an HOG feature vector associated with detector window 20 is moved from external memory to internal memory for each position of detector window 20 within image frame 10, HOG feature block components for each feature block FB1, FB2, FB3, ... FBx may be moved from external memory to internal memory multiple times. Such overlap occurs since a feature block (and thus its corresponding HOG feature block component) is weighted differently by hyperplane 30 depending on its relative position in detector window 20.

Figure 3:
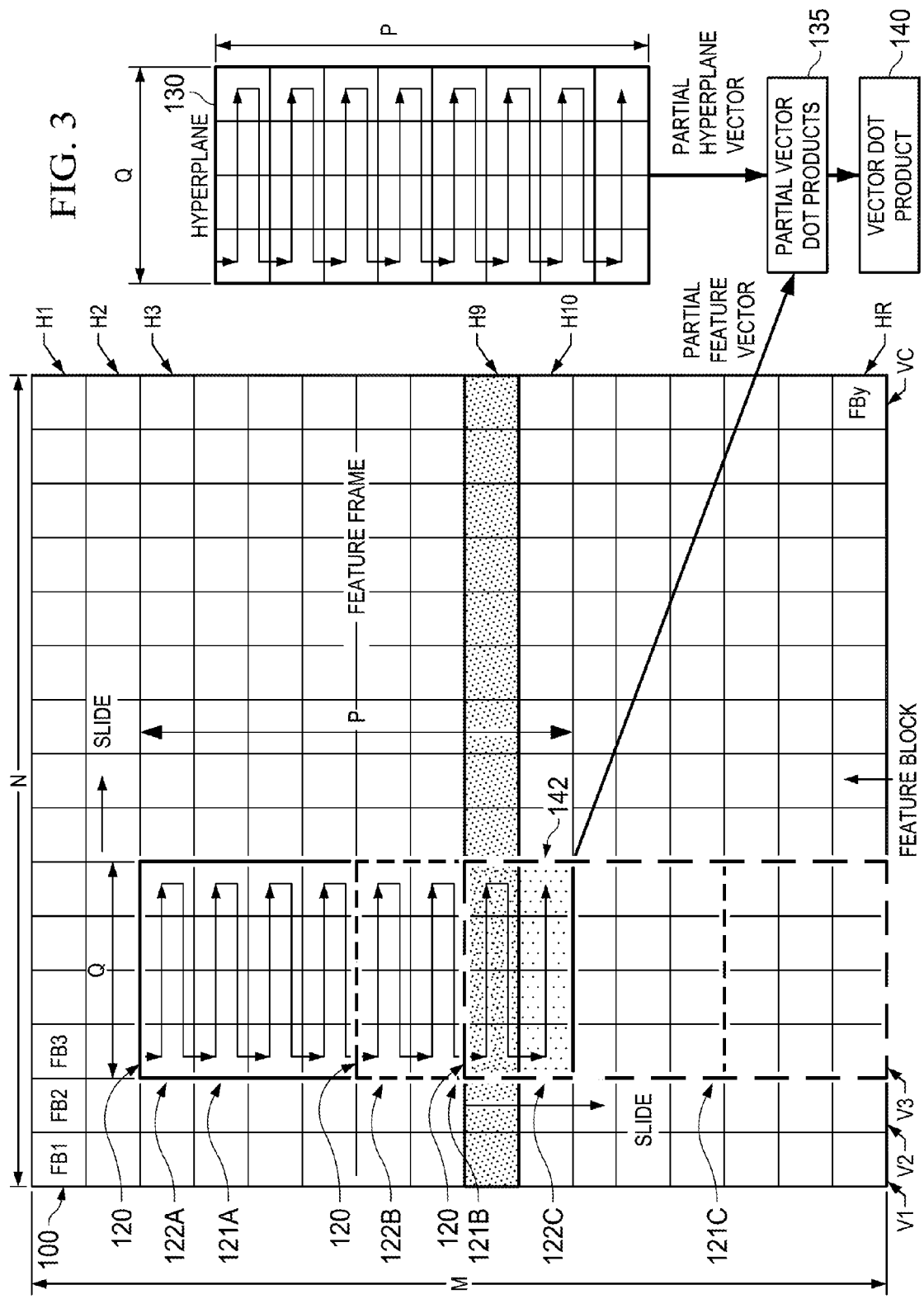
FIG. 3 illustrates another exemplary methodology for detecting an object in an image frame according to various aspects of the present disclosure.

The present disclosure, as described below, proposes an exemplary methodology for object detection and classification that can reduce or eliminate such redundancy. For example, FIG. 3 illustrates an exemplary methodology for detecting an object in an image frame 100 according to various aspects of the present disclosure. In various implementations, the exemplary methodology detects a pedestrian in the image frame 100. FIG. 3 has been simplified for the sake of clarity to better understand the inventive concepts of the present disclosure. Additional features can be added to the exemplary methodology and associated image frame 100, and some of the features described below can be replaced or eliminated in other embodiments of the exemplary methodology and associated image frame 100.

In FIG. 3, similar to image frame 10, image frame 100 is partitioned into feature blocks FB1, FB2, FB3, ... FBy, where y is a total number of feature blocks of image frame 100. Feature blocks FB1, FB2, FB3, ... FBy can be grouped into feature block rows (groups of feature blocks in a horizontal direction of image frame 100) and feature block columns (groups of feature blocks in a vertical direction of image frame 100). For example, in the depicted embodiment, image frame 100 includes feature block rows H1, H2, H3, ... HR and feature block columns V1, V2, V3, ... VC, where R is a total number of feature block rows of image frame 100 and C is a total number of feature block columns of image frame 100. Each feature block row H1, H2, H3, ... HR includes a number of feature blocks, N, in the horizontal direction of image frame 100; and each feature block column V1, V2, V3, ... VC includes a number of feature blocks, M, in the vertical direction of image frame 100.

Similar to feature blocks FB1, FB2, FB3, ... FBx of image frame 10, each feature block FB1, FB2, FB3, ... FBy of image frame 100 has an associated feature block component, such as an associated HOG feature block component. For example, in various implementations, image frame 100 can be partitioned into cells (various spatial regions of image frame 100), where each cell includes one or more pixels of image frame 100. Each pixel has an edge (gradient) intensity value and an edge angle (orientation) value. For each cell, a one-dimensional edge intensity histogram can be generated by accumulating edge intensity values for pixels within the cell, a one-dimensional edge angle histogram can be generated by accumulating edge angle values for pixels within the cell, and a one-dimensional histogram can be generated by combining the edge intensity histogram and the edge angle histogram, where the one-dimensional histogram provides HOG descriptors for the cell. The cells can then be grouped into blocks (here, feature blocks FB1, FB2, FB3, ... FBy), where each cell can form a portion of more than one block. For each block, a measure of intensity ("energy") can be accumulated over the cells within the block and used to normalize the HOG feature descriptors of each of the cells within the block, such that the block has an associated HOG feature block component. In various implementations, the associated HOG feature block component can thus include a vector of HOG feature descriptors of normalized cell histograms for the cells within the block.

Using the HOG feature block components, image frame 100 can be analyzed to detect objects in image frame 100. For example, a detector window can be defined and aligned with a portion of image frame 100, such that the detector window overlaps (spans) the portion of image frame 100; and HOG feature block components corresponding with the portion of image frame 100 overlapped by the detector window can be evaluated to identify an object in the portion of image frame 100. The detector window can be moved to various locations within image frame 100 to evaluate various portions of image frame 100 for object detection. In various implementations, the detector window can be moved both vertically and horizontally within image frame 100 to evaluate a region of interest of image frame 100, which may include all of image frame 100 or selected portions of image frame 100. In various implementations, image frame 100 can be evaluated using detector windows having various sizes—a number of detector window scales, L. For example, in some embodiments, three detector window scales (L=3) can be applied to image frame 100 to detect objects, such as a first detector window having a 48×80 pixel size, a second detector window having a 64×128 pixel size, and a third detector window having a 80×160 pixel size. Evaluating image frame 100 with detector windows having different sizes can enhance object detection reliability.

A detector window 120 overlaps various portions 121A, 121B, and 121C of image frame 100, and thus, portions of feature blocks FB1, FB2, FB3, ... FBy that correspond with the image frame portions 121A, 121B, and 121C. In particular, detector window 120 overlaps a number of feature block rows, P, and a number of feature block columns, Q. For example, detector window 20 overlaps eight feature block rows (P=8) and four feature block columns (Q=4) at three different positions within image frame 100—position 122A (overlapping image frame portion 121A), position 122B (where detector window 120 has been moved vertically down three feature block rows from position 122A to overlap image frame portion 121B), and position 122C (where detector window 120 has been moved vertically down three rows from position 122B to overlap image frame portion 121C). At each position within image frame 100, detector window 120 (and more particularly, the image portion overlapped by detector window 120) has an associated HOG feature vector, which is represented by HOG feature block components of the feature blocks corresponding with the image portion overlapped by detector window 120. For example, in the depicted embodiment, detector window 120 has an associated HOG feature vector represented by HOG feature block components of the feature blocks corresponding with image portion 121A overlapped by detector window 120 at position 122A, an associated HOG feature vector represented by HOG feature block components of the feature blocks corresponding with image portion 121B overlapped by detector window 120 at position 122B, and an associated HOG feature vector represented by HOG feature block components of the feature blocks corresponding with image portion 121C overlapped by detector window 120 at position 122C. Put another way, at each position, the HOG feature vector associated with detector window

120 can be formed by grouping normalized cell histograms (the HOG descriptors) of the feature blocks overlapped by detector window 120.

A classifier can evaluate and classify the HOG feature vector as positive (indicating that the HOG feature vector represents an object) or negative (indicating that the HOG feature vector does not represent an object), thereby providing an object/non-object classification for the portion of image frame 100 overlapped by (corresponding with) detector window 120. In various implementations, the classifier is a support vector machine (SVM) classifier, such as a linear SVM, that can be trained to detect objects for various sizes of detector windows. For example, SVM classifier can be a binary classifier that uses training data to construct a hyperplane for optimally separating HOG feature vectors into two categories—here, object or non-object. In various implementations, SVM classifier is trained with an image set divided into pedestrian class images and non-pedestrian class images, where SVM classifier has further been trained to classify images using different sizes of detector windows.

In the depicted embodiment, SVM classifier constructs a hyperplane 130 that can be used to identify HOG feature vectors associated with detector window 120 (and thus HOG feature vectors representing images in image frame 100) as falling within the object (pedestrian) class or non-object (non-pedestrian) class. Hyperplane 130 has a size that corresponds with a size of the detector window being used for object detection and classification. For example, here, hyperplane 130 also spans a number of feature block rows, P, and a number of feature block columns, Q. In FIG. 3, in contrast to the exemplary methodology depicted in FIG. 1, and as further described below, SVM classifier combines partial HOG feature vectors associated with detector window 120 with partial hyperplane vectors associated with hyperplane 130 (in other words, a weighted sum of HOG feature descriptors) using a partial vector dot product 135. Partial vector dot products associated with detector window 120 are then combined to provide a vector dot product 140, and SVM classifier evaluates vector dot product 140 to classify the HOG feature vector (and thus image portion overlapped by detector window 120) as object or non-object. Such classification process can be performed for HOG feature vectors associated with detector window 120 at various positions within image frame 100 (including position 122A, position 122B, and position 122C), such that various portions of image frame 100 can be classified as object or non-object.

As evident from FIG. 3, a feature block of image frame 100 can be a part of more than one detector window during the object detection and classification process. For example, in the depicted embodiment, at position 122A, position 122B, and position 122C, detector window 120 overlaps a same feature block group 142, specifically a group of feature blocks in feature block row H9 and feature block row H10 of image frame 100. At position 122A, feature block group 142 corresponds with seventh and eighth feature block rows of detector window 120; at position 122B, feature block group 142 corresponds with fourth and fifth feature block rows of detector window 120; and at position 122C, feature block group 142 corresponds with first and second feature block rows of detector window 120. The exemplary methodology depicted in FIG. 3 takes advantage of the detector window 120 overlapping feature block group 142 at various positions within image frame 100 (and thus a same set of feature block components of image frame 100) to reduce data exchange between internal memory and external memory during the object detection and classification process.

For example, though the exemplary methodologies depicted in FIG. 1 and FIG. 3 both place HOG feature block components corresponding to the image frame in external memory, in contrast to the exemplary methodology depicted in FIG. 1 (which moves an HOG feature block component from external memory to internal memory multiple times), the exemplary methodology depicted in FIG. 3 can move the HOG feature block component from external memory to internal memory a single time during the object detection and classification process. More specifically, by implementing the exemplary methodology in FIG. 1, HOG feature block components of feature block group 142 are moved from external memory to internal memory at least three times—when moving an HOG feature vector associated with detector window 120 at position 122A, when moving an HOG feature vector associated with detector window 120 at position 122B, and when moving an HOG feature vector associated with detector window 120 at position 122C—and may be moved from external memory to internal memory other times depending on other positions of detector window 120 and other detector windows implemented to evaluate image frame 100. In contrast, the methodology depicted in FIG. 3 moves HOG feature block components of a feature block row from external memory to internal memory and then determines partial vector dot products for each detector window that overlaps the HOG feature block components of the feature block row. For example, in FIG. 3, HOG feature block components associated with feature block row H9 are moved from external memory to internal memory. At position 122A, a partial feature vector associated with detector window 120—feature block components of feature block row H9 that are overlapped by detector window 120—can be combined with a partial hyperplane vector that corresponds with the seventh row of detector window 120 to determine a partial vector dot product. Similarly, at position 122B, a partial feature vector associated with detector window 120—feature block components of feature block row H9 that are overlapped by detector window 120—can be combined with a partial hyperplane vector that corresponds with the fourth row of detector window 120 to determine a partial vector dot product; and at position 122C, a partial feature vector associated with detector window 120—feature block components of feature block row H9 that are overlapped by detector window 120—can be combined with a partial hyperplane vector that corresponds with the first row of detector window 120 to determine a partial vector dot product.

Once partial vector dot products are determined for all detector windows that overlap feature block row H9 for object detection and classification, HOG feature block components of another feature block row, such as feature block row H10, are moved from external memory to internal memory. For example, in FIG. 3, HOG feature block components associated with feature block row H10 are moved from external memory to internal memory. At position 122A, a partial feature vector associated with detector window 120—feature block components of feature block row H10 that are overlapped by detector window 120—can be combined with a partial hyperplane vector that corresponds with the eighth row of detector window 120 to determine a partial vector dot product. Similarly, at position 122B, a partial feature vector associated with detector window 120—feature block components of feature block row H10 that are overlapped by detector window 120—can be combined with a partial hyperplane vector that corresponds with the fifth row of detector window 120 to determine a partial vector dot product; and at position 122C, a partial feature vector associated with detector window 120—feature block components of feature block row H10 that are overlapped by detector window 120—can be combined with a partial hyperplane vector that corresponds with the second row of detector window 120 to determine a partial vector dot product. Such process is performed for each feature block row of image frame 100 (here, feature block rows H1, H2, H3, . . . HR) until HOG feature block components of each feature block row have been moved from external memory to internal memory, and partial vector dot products have been determined for detector windows overlapping each feature block row.

It is noted that, in various implementations, feature block components of more than one feature block row can be moved from external memory to internal memory at a time for determining the partial vector dot products. For example, in the present example, feature block components of both feature block row H9 and feature block row H10 can be moved from external memory to internal memory, partial vector dot products can be determined for detector windows overlapping feature block row H9 and/or feature block row H10, and then feature block components another group of feature block rows (for example, feature block row H11 and feature block row H12) until feature block components of each feature block row have been moved from external memory to internal memory, and partial vector dot products have been determined for detector windows overlapping each feature block row.

As noted above, the exemplary methodology depicted in FIG. 3 combines partial vector dot products 135 associated with a detector window to determine vector dot product 140 associated with the detector window (which represents an image frame portion overlapped by the detector window at some position within image frame 100), which SVM can then classify as object or non-object. For example, in the depicted embodiment, the partial dot product associated with the seventh row of detector window 120 at position 122A is combined with the partial dot product associated with the eighth row of detector window 120 at position 122A, which is further combined with partial dot products associated with first through sixth rows of detector window 120 at position 122A, to arrive at a vector dot product that can be used to classify image portion 121A overlapped by detector window 120. Similarly, the partial dot product associated with the fourth row of detector window 120 at position 122B is combined with the partial dot product associated with the fifth row of detector window 120 at position 122B, which is further combined with partial dot products associated with first through third and sixth through eighth rows of detector window 120 at position 122B, to arrive at a vector dot product that can be used to classify image portion 121B overlapped by detector window 120; and the partial dot product associated with the first row of detector window 120 at position 122C is combined with the partial dot product associated with the second row of detector window 120 at position 122C, which is further combined with partial dot products associated with third through eighth rows of detector window 120 at position 122C, to arrive at a vector dot product that can be used to classify image portion 121C overlapped by detector window 120. Such process can be performed for detector window 120 at each position within image frame 100. In various implementations, such process is also performed for detector windows having scales different than detector window 120, which are also implemented to evaluate image frame 100 during object detection and classification.

Partial vector dot products can be stored in a dot product table, which can be provided in internal memory. For example, the exemplary methodology in FIG. 3 can define a dot product table for detector window 120, where the dot product table includes an entry for each position of detector window 120 within image frame 100 along the horizontal and vertical directions. The dot product table can include an entry for a partial vector dot product for detector window 120 at position 122A, an entry for a partial vector dot product for detector window 120 at position 122B, an entry for partial vector dot product for detector window 120 at position 122C, and entries for partial vector dot products for detector window 120 at various other positions within image frame 100. In the depicted embodiment, the entry for the partial vector dot product for detector window 120 can include a combination of partial vector dot products for the first through sixth rows of detector window 120 at position 122A. The entry can be updated with the partial vector dot product associated with the seventh row of detector window 120 at position 122A when feature block components of feature block row H9 are moved from external memory to internal memory, and then again, with the partial vector dot product associated with the eighth row of detector window 120 at position 122A when feature block components of feature block row H10 are moved from external memory to internal memory. The entries for the partial vector dot products for detector window 120 at other positions can similarly be updated during the object detection and classification process.

In various implementations, for a detector window having a defined scale, the exemplary methodology depicted in FIG. 3 can define a vector dot product table with one entry for each detector window position along a horizontal direction and a vertical direction of an image frame to be evaluated by the detector window. For example, let T(i,j) represent a dot product entry for a $(i,j)^{th}$ detector window, where i represents a feature block row of the image frame, j represents a feature block column of the image frame, P represents a number of feature block rows overlapped by the detector window at the $(i,j)^{th}$ position, Q represents a number of columns in the detector window at the $(i,j)^{th}$ position, M represents a number of feature blocks in the vertical direction of the image frame, and N represents a number of feature blocks in the horizontal direction of the image frame. For the object detection and classification process, the exemplary methodology can initialize the vector dot product table to zero (which can be referred to as a Step 1), represented by Equation (6):

$$T(i',j')=0 \forall i' \leq M-P, \forall j' \leq N-Q; i=0$$

where i is a feature block row number. Then, feature block components of an $i^{th}$ feature block row of the image frame can be moved from external memory into internal memory (which can be referred to as Step 2), where $\vec{G}j$ represents a partial feature vector corresponding to a $j^{th}$ column (where j is a feature block column number) and where $\vec{H}k$ represents a partial hyperplane vector corresponding to a $k^{th}$ row of the detector window (where k=0 . . . P). The exemplary methodology can compute partial vector dot products for every position of the detector window that overlaps the $i^{th}$ feature block row (which can be referred to as Step 3), represented by Equation (7):

--- for all j from 0 to N − Q
    for all k from 0 to P − 1
        $T(i-k,j) = T(i-k,j) + \vec{H}k \cdot \vec{G}j \quad \forall \quad 0 \leq (i-k) \leq M-P,$
    end
end

---

Step 2 and Step 3 can be repeated for all rows (which can be referred to as Step 4), represented by Equation (8):

$$i=i+1$$

IF (i<M) go to Step 2

Note that the process associated with Step 1 through Step 4 above considers one scale (size) of detector window. Such process can be repeated for each scale of detector window used for the object detection and classification process applied to the image frame, where a separate vector dot product table for each scale will be defined.

Figure 4:
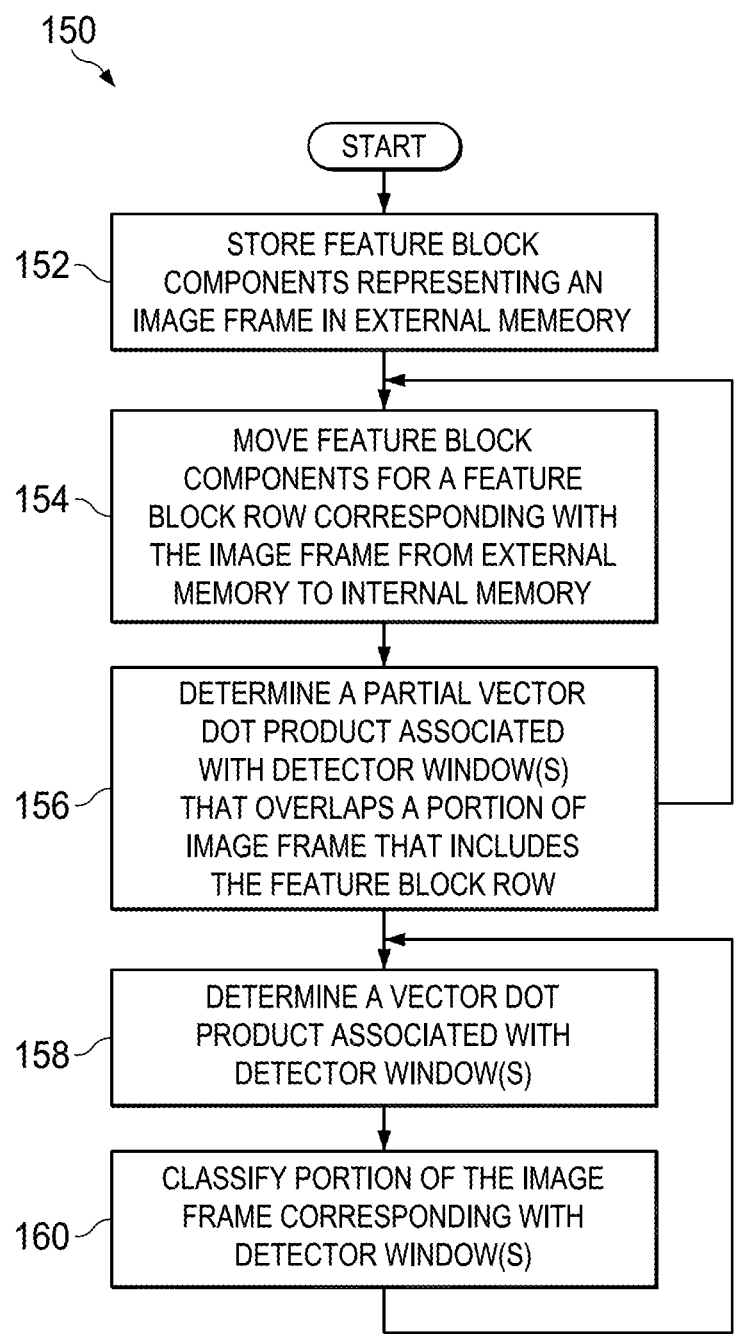
FIG. 4 is a flowchart of an exemplary method for detecting objects in an image frame, such as that associated with the exemplary methodology depicted in and described with reference to FIG. 3, according to various aspects of the present disclosure.

FIG. 4 is a flowchart of an exemplary method 150 for detecting objects in an image frame, such as that associated with the exemplary methodology depicted in and described with reference to FIG. 3, according to various aspects of the present disclosure. The method 150 begins at block 152 by storing feature block components that represent (correspond with) an image frame in external memory. For example, referring to FIG. 3 and corresponding description, image frame 100 can be analyzed to define feature block components, such as HOG feature block components, that represent image frame 100. The HOG feature block components, which can be used to classify portions of image frame 100 during subsequent processing, can be stored in an external memory. At block 154, feature block components for a feature block row corresponding with the image frame are moved from external memory to internal memory. For example, referring to FIG. 3, feature block components of a feature block row of image frame 100, such as feature block row H9, are moved from external memory to internal memory. At block 156, method 150 proceeds to determine a partial vector dot product of a detector window that overlaps the feature block row. More specifically, a partial hyperplane vector and a partial feature vector associated with the detector window that overlaps the feature block row can be combined to determine the partial vector dot product. In various implementations, block 156 can be repeated until partial vector dot products are determined for all positions of detector window that overlap the feature block row during the object detection and classification process, and can further be repeated until partial vector dot products are determined for all detector windows that overlap the feature block row during the object detection and classification process. For example, referring to FIG. 3, partial vector dot products are determined for all positions of detector window 120 that overlap feature block row H9 (for example, at position 122A, position 122B, and position 122C). Once partial vector dot products are determined for all detector windows that overlap feature block row H9 for object detection and classification, method 150 returns to step 154, where HOG feature block components of another feature block row, such as feature block row H10, are moved from external memory to internal memory, and step 156 is repeated until partial vector dot products are determined for all detector windows that overlap feature block row H10 for object detection and classification. Such process continues until feature block components of every feature block row corresponding with the image frame have been moved from external memory to internal memory. The method 150 then proceeds to block 158 by determining a vector dot product associated with the detector window. For example, referring to FIG. 3, partial vector dot products determined for detector window 120 at position 122A are combined to determine a vector dot product associated with detector window 120 at position 122A. At block 160, method 150 classifies a portion of the image frame corresponding with the detector window. For example, referring to FIG. 3, a portion of the image frame corresponding with detector window 120 at position 122A is determined based on the vector dot product, as described above. Blocks 158 and Block 160 can be repeated until portions of the image frame corresponding with all detector windows at every position within the image frame have been classified as an object or non-object. Additional steps can be provided before, during, and after the method 150 and some of the steps described can be replaced or eliminated for other embodiments of the method 150.

The object classification process implementation described with reference to FIG. 3 and FIG. 4 can signifi-cantly reduce data exchange between internal memory and external memory by moving feature block components associated with a feature block of an image frame a single time. For example, by implementing the methodology of FIG. 3 and FIG. 4, a total data bandwidth (Bt') is independent of a number of detector window scales and/or a number of detector windows used for the object classification process, such that the total bandwidth can simply be represented by Equation (9):

$$Bt'=\text{Bandwidth per Frame}\times Fr=(Sb\times M\times N)\times Fr$$

where Sb is a size of a feature block in words, N is a number of feature blocks in a horizontal direction of the image frame (for example, a number of feature blocks in each feature block row of the image frame), M is a number of feature blocks in a vertical direction of the image frame (for example, a number of feature blocks in each feature block column of the image frame), and Fr is a frame rate. Accordingly, the methodology depicted in FIGS. 3 and 4 can achieve significant bandwidth reduction. For example, considering the exemplary typical object classification case described above, where:

the image frame is partitioned into 79 feature blocks in a horizontal direction (N=79) and 44 feature blocks in a vertical direction (M=44) (such that each feature block row includes 79 feature blocks and each feature block column includes 44 feature blocks), three detector windows having different sizes are applied to the image frame for object classification (L=number of scales=3):

Detector Window 1 $(i=0)=(P_0,Q_0)=(9,5)$

Detector Window 2 $(i=1)=(P_1,Q_1)=(15,7)$

Detector Window 3 $(i=2)=(P_2,Q_2)=(19,9)$ (at each position, Detector Window 1 spans 9 feature block rows ($P_0$=9) and 5 feature block columns ($Q_0$=5); Detector Window 2 spans 15 feature block rows ($P_1$=15) and 7 feature block columns ($Q_1$=7); and Detector Window 3 spans 19 feature block rows ($P_2$=19) and 9 feature block columns ($Q_2$=9)), a size of each feature block is 32 words (Sb=32), and images can be processed for object classification at 30 frames per second (frame rate=Fr=30), the methodology depicted in FIGS. 3 and 4 can achieve the following bandwidth figures:

Total Bandwidth (Bt')=3.336 M Words $$Bt'=\text{Bandwidth per Frame}\times Fr=(Sb\times M\times N)\times Fr=32\times 79\times 44\times 30$$

As noted, the total bandwidth is independent of the number of detector window scales and/or number of detector windows, which can significantly reduce bandwidth needed for the object classification process. When compared to the total bandwidth (Bt) achieved by implementing the methodology in FIG. 1 and FIG. 2, the total bandwidth (Bt') achieved by implementing the methodology depicted in FIG. 3 and FIG. 4 clearly improves bandwidth efficiency for object classification processes. For example, a comparison (C) of the bandwidths can be represented by Equation (10):

$$C = \frac{Bt}{Bt'}$$

In the example described herein, the exemplary methodology depicted in FIG. 3 and FIG. 4 can improved total bandwidth by 192 times compared to the exemplary methodology depicted in FIG. 1 and FIG. 2.

$$C = \frac{Bt}{Bt'} = \frac{640.41 \text{ M Words}}{3.336 \text{ M Words}} = 192$$

To reduce processing, and further enhance object detection and classification efficiency, the exemplary methodology can implement temporal redundancy between successively analyzed image frames. For example, in various implementations, a vector dot product table is used for object detection and classification of multiple image frames. For a given image frame, a detector window that slides within the given image frame to overlap various portions of the image frame for object detection and classification can skip vector dot product table entries, for example, in a vertical direction and/or a horizontal direction. In various implementations, between two consecutive image frames, a starting position of the sliding detector window is changed, such that the detector window will cover an entire region of interest (ROI) in multiple frames, where each image frame classification includes combined vector dot product classification results of previous image frames.

For example, let R represent a number of an image frame being processed for object detection and classification; C represent a horizontal skip count; D represent a vertical skip count; T(i,j) represent a dot product entry for a (i,j)$^{th}$ detector window, where i represents a feature block row of the image frame and j represents a feature block column of the image frame; and (X,Y) represent a starting position along horizontal and vertical directions, respectively. The exemplary methodology can initialize an array A (having a size [C][D]) for storing starting coordinates of a sliding detector window in asset of consecutive C×D image frames, such that an entire region of interest (ROI) is covered. For a given vector dot product table, the exemplary methodology can, for every image frame R, perform the following represented by Equation (8) (which can be referred to as a Step 1):

$$b = R \% (C*D)$$

$$(X,Y) = A(b);$$

and then update the vector dot table selectively (which can be referred to as a Step 2), represented by Equation (9):

```
for all i from 0 to M - 1
    for all j from 0 to N - 1
        UPDATE T(i,j) IF { (j %C  ==  X) And (i %D  ==  Y) }
    end
end
``` where UPDATE refers to a partial vector dot product determination arrived implementing the exemplary methodology as described above. A vector dot product classification at each image frame can then be combined with vector dot product classification results of previous '(C*D)−1' frames. It is noted that a value of C, D, and order of starting positions (in array A) of the detector windows depends on application requirements of the object detection and classification process implemented to evaluate the image frames.

Figure 5:
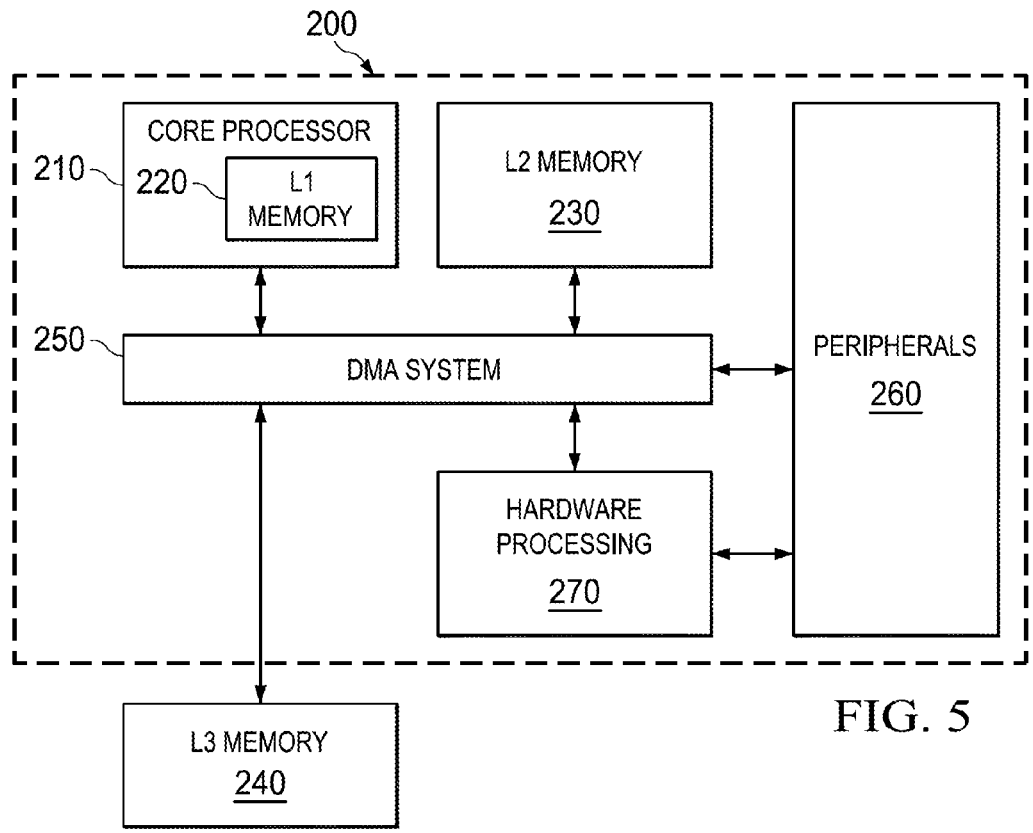
FIG. 5 is a schematic block diagram of an exemplary processor for implementing an object detection and classification process, such as the object detection and classification methodologies depicted and described with reference to FIGS. 1-4, according to various aspects of the present disclosure.

FIG. 5 is a schematic block diagram of an exemplary processor 200 for that can implement an object detection and classification process, such as the object detection and classification methodology depicted and described with reference to FIGS. 1-4, according to various aspects of the present disclosure. In the depicted embodiment, processor 200 is a digital signal processor that includes a core processor 210, a memory system (for example, a L1 memory 220, a L2 memory 230, and a L3 memory 240), a direct memory access (DMA) system 250, a peripherals block 260, and a hardware processing block 270. In various implementations, digital signal processor is an Analog Devices, Inc.'s (ADI's) Blackfin® Processor, such as from ADI's Model No. ADSP-BF60x family of Blackfin® processors. FIG. 5 has been simplified for the sake of clarity to better understand the inventive concepts of the present disclosure. Additional features can be added in processor 200, and some of the features described below can be replaced or eliminated in other embodiments of processor 200.

Core processor 210 can perform computation and data processing functions of a digital signal processor. In various implementations, core processor 210 can include a control unit that facilitates program execution, and a compute unit that performs the computation and data processing functions. The control unit can include an arithmetic logic unit and data address generation (ALU-DAG) unit, a program sequencer, and/or other components depending on design requirements of processor 200. The ALU-DAG unit can support general purpose integer computations and supply addresses for memory fetches, and the program sequencer can control flow of instruction execution. The compute unit can include an arithmetic logic unit (ALU), a multiplier-accumulator (MAC), a shifter, a register file, other components, or combinations thereof depending on design requirements of processor 200. The ALU can perform arithmetic and logic operations, such as add, subtract, negate, increment, decrement, absolute value, AND, OR, EXCLUSIVE OR, NOT, divide primitive, other arithmetic operations, other logic operations, or combinations thereof. The MAC can perform multiplication operations as well as multiply and accumulate operations, such as single-cycle multiply, multiply/add, multiply/subtract, other operations, or combinations thereof. The shifter can perform logical and arithmetic shifts, bit manipulations, normalization, denormalization, derive-exponent operations, other operations, or combinations thereof. The various arithmetic operations, logic operations, and other operations can be performed on both fixed-point and floating-point formats. In various embodiments, the ALU, MAC, and/or shifter include registers associated therewith. The register file can include general purpose registers having widths dependent on design requirements of processor 200, such as 32-bit general purposes registers, 40-bit general purpose registers, 64-bit general purpose registers, 128-bit general purposes registers, other width general purpose registers, or a combination thereof.

Memory system includes internal memory and external memory that can store information/data to be processed by the processor 200 (data memory), programs implemented by the processor 200 to process the information/data (program memory), or a combination thereof. In the depicted embodiment, internal memory includes L1 memory 220 and L2 memory 230 (also referred to as a secondary memory), where core processor 210 includes L1 memory; and external memory includes L3 memory 240. L1 memory 220, L2 memory 230, and L3 memory 240 can be configured as any type of volatile or non-volatile memory depending on design requirements of processor 200. For example, in various implementations, L1 memory 220 is configured as a random access memory, such as static random access memory (SRAM); L2 memory 230 is configured to include a random only memory (ROM) and a random access memory, such as SRAM; and L3 memory is configured to include random access memory, such as SRAM, dynamic random access memory (DRAM), synchronous dynamic random access memory (SDRAM), or ferroelectric random access memory (FRAM), or other type of random access memory. In various implementations, a portion of L1 memory 220, L2 memory 220, and/or L3 memory 230 can be configured as cache memory.

DMA system 250 is configured to facilitate data transfer in processor 200, particularly to transfer (move) data between memory and peripheral block 260 and/or memory to memory. Such data transfers can be achieved without intervention by core processor 210. In various implementations, DMA controller 250 can transfer (move) data between the internal memory and external memory of processor 200. For example, DMA controller 250 can move data from/to L1 memory 220, L2 memory 230, and/or L3 memory 240.

Processor 200 can include an object detection module that is configured to perform object detection and classification process that minimizes data transfer between the internal memory and external memory. In the depicted embodiment, the object detection module implements the exemplary object detection and classification module described above with reference to FIG. 3 and FIG. 4. In various implementations, core processor 210 or hardware processing block 270 can include the object detection module. In various implementations, both core processor 210 and hardware processing block 270 can include a portion of the object detection module.

Figure 6:
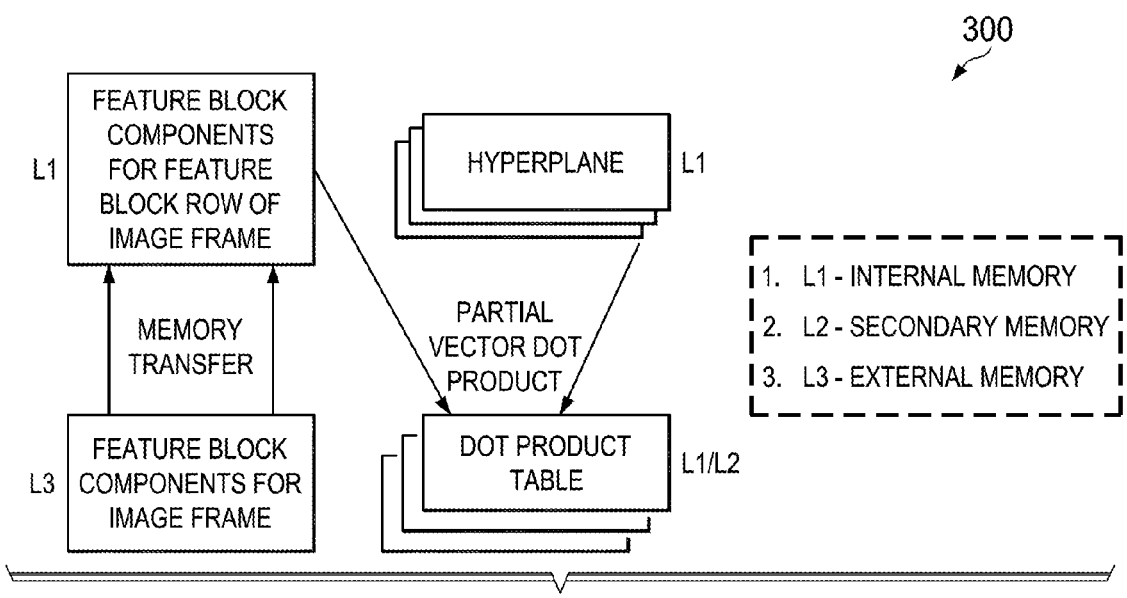
FIG. 6 is a schematic block diagram of an exemplary memory scheme for a processor having an object detection module, such as the processor of FIG. 5, that implements an object detection and classification process, such as that depicted and described with reference to FIGS. 3 and 4, according to various aspects of the present disclosure.

FIG. 6 is a schematic block diagram of an exemplary memory scheme 300 for a processor having an object detection module, such as processor 200 of FIG. 5, that implements an object detection and classification process, such as that depicted and described with reference to FIGS. 3 and 4, according to various aspects of the present disclosure. For example, in various implementations, feature block components are stored in L3 memory, such as L3 memory 240 of processor 200; vector dot product tables are stored in L1 memory and/or L2 memory, such as L1 memory 220 and/or L2 memory 230 of processor 200; and hyperplanes are stored in L1 memory and/or L3 memory, such as L1 memory 220 and/or L3 memory 240 of processor 200. Feature block components for a feature block row of image frame can be transferred from L3 memory to L1 memory, for example, from L1 memory 220 to L3 memory 240 by DMA system 250. Processor 200 can then determine partial vector dot products using the hyperplanes and feature block components for the feature block row, and store the partial vector dot products in the dot product tables, as described in detail above. FIG. 6 has been simplified for the sake of clarity to better understand the inventive concepts of the present disclosure. Additional features can be added in memory scheme 300, and some of the features described below can be replaced or eliminated in other embodiments of memory scheme 300.

The various functions outlined herein may be implemented by logic encoded in one or more non-transitory and/or tangible media (for example, embedded logic provided in an application specific integrated circuit (ASIC), as digital signal processor (DSP) instructions, software (potentially inclusive of object code and source code) to be executed by a processor, or other similar machine, etc.). In some of these instances, a memory element can store data used for the operations described herein. This includes the memory element being able to store logic (for example, software, code, processor instructions) that is executed by a processor to carry out the activities described herein. The processor can execute any type of instructions associated with the data to achieve the operations detailed herein. In various implementations, the processor can transform an element or an article (such as data) from one state or thing to another state or thing. In another example, the activities outlined herein may be implemented with fixed logic or programmable logic (such as software/computer instructions executed by the processor) and the elements identified herein can be some type of a programmable processor (such as a DSP), programmable digital logic (e.g., a FPGA, an erasable programmable read only memory (EPROM), an electrically erasable programmable ROM (EEPROM)), or an ASIC that includes digital logic, software, code, electronic instructions, or any suitable combination thereof.

In various implementations, the system and/or the various the circuits and/or components illustrated in the FIGURES can be implemented on a board of an associated electronic device. The board can be a general circuit board that can hold various components of an internal electronic system of the electronic device and, further, provide connectors for other peripherals. The board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, other considerations, or a combination thereof. Other components, such as external storage, sensors, controllers for audio/video display, and peripheral devices may be attached to the board as plug-in cards, via cables, or integrated into the board itself.

In various implementations, the system and/or the various the circuits and/or components illustrated in the FIGURES can be implemented as stand-alone modules (for example, a device with associated components and circuitry configured to perform a specific application or function) or implemented as plug-in modules into application specific hardware of electronic devices. Note that particular embodiments of the present disclosure may be readily included in a system-on-chip (SOC) package, either in part, or in whole. An SOC represents an integrated circuit that integrates components of a computer or other electronic system into a single chip. It may contain digital, analog, mixed-signal, and often radio frequency functions: all of which may be provided on a single chip substrate. Other embodiments may include a multi-chip-module (MCM), with a plurality of separate ICs located within a single electronic package and configured to interact closely with each other through the electronic package. In various other embodiments, the various functions described herein may be implemented in one or more semiconductor cores (such as silicon cores) in application specific integrated circuits (ASICs), field programmable gate arrays (FPGAs), other semiconductor chips, or combinations thereof.

Note that the activities discussed above with reference to the FIGURES are applicable to any integrated circuits that involve signal processing (for example, gesture signal processing), particularly those that can execute specialized software programs or algorithms, some of which may be associated with processing digitized real-time data. Certain embodiments can relate to multi-DSP signal processing, floating point processing, signal/control processing, fixed-function processing, microcontroller applications, etc. In certain contexts, the features discussed herein can be applicable to medical systems, scientific instrumentation, wireless and wired communications, radar, industrial process control, audio and video equipment, current sensing, instrumentation (which can be highly precise), and other digital-processing-based systems. Moreover, certain embodiments discussed above can be provisioned in digital signal processing technologies for medical imaging, patient monitoring, medical instrumentation, and home healthcare. This could include pulmonary monitors, accelerometers, heart rate monitors, pacemakers, etc. Other applications can involve automotive technologies for safety systems (e.g., stability control systems, driver assistance systems, braking systems, infotainment and interior applications of any kind). Furthermore, powertrain systems (for example, in hybrid and electric vehicles) can use high-precision data conversion products in battery monitoring, control systems, reporting controls, maintenance activities, etc. In yet other example scenarios, the teachings of the present disclosure can be applicable in the industrial markets that include process control systems that help drive productivity, energy efficiency, and reliability. In consumer applications, the teachings of the signal processing circuits discussed above can be used for image processing, auto focus, and image stabilization (e.g., for digital still cameras, camcorders, etc.). Other consumer applications can include audio and video processors for home theater systems, DVD recorders, and high-definition televisions. Yet other consumer applications can involve advanced touch screen controllers (e.g., for any type of portable media device). Hence, such technologies could readily part of smartphones, tablets, security systems, PCs, gaming technologies, virtual reality, simulation training, etc.

The specifications, dimensions, and relationships outlined herein have only been offered for purposes of example and teaching only. Each of these may be varied considerably without departing from the spirit of the present disclosure, or the scope of the appended claims. The specifications apply only to non-limiting examples and, accordingly, they should be construed as such. In the foregoing description, example embodiments have been described with reference to particular arrangements. Various modifications and changes may be made to such embodiments without departing from the scope of the appended claims. The description and drawings are, accordingly, to be regarded in an illustrative rather than a restrictive sense. Further, the operations and steps described with reference to the preceding FIGURES illustrate only some of the possible scenarios that may be executed by, or within, the various apparatuses, processors, devices, and/or systems, described herein. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the device and/or system in that any suitable arrangements, chronologies, configurations, and timing mechanisms may be provided without departing from the teachings of the discussed concepts.

Note that with the numerous examples provided herein, interaction may be described in terms of two, three, four, or more components. However, this has been done for purposes of clarity and example only. It should be appreciated that the device and system described herein can be consolidated in any suitable manner. Along similar design alternatives, any of the illustrated features of the FIGURES may be combined in various possible configurations, all of which are clearly within the broad scope of this Specification. In certain cases, it may be easier to describe one or more of the functionalities of a given set of flows by only referencing a limited number of device and/or system features. It should be appreciated that the features illustrated in the FIGURES and their associated teachings are readily scalable and can accommodate a large number of features, as well as more complicated/sophisticated arrangements and configurations. Accordingly, the examples provided should not limit the scope or inhibit the broad teachings of the device and/or system as potentially applied to a myriad of other architectures.

Further note that references to various features (for example, elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "steps for" are specifically used in the particular claims; and (b) does not intend, by any statement in the specification, to limit this disclosure in any way that is not otherwise reflected in the appended claims.

Example Embodiment Implementations

One particular example implementation may include an apparatus having means for detecting and classifying objects. Various implementations can include means for generating feature block components representing an image frame, wherein the image frame is partitioned into feature block rows, such that each feature block row has associated feature block components; and analyzing the image frame using the feature block components to detect objects. Various implementations can further include means for, for each feature block row, evaluating feature block components associated with the feature block row to determine a partial vector dot product for each detector window that overlaps a portion of the image frame that includes the feature block row, such that each detector window has an associated group of partial vector dot products; and for each detector window, determining a vector dot product associated with the detector window based on the associated group of partial vector dot products, and classifying an image frame portion corresponding with the detector window as an object or non-object based on the vector dot product. The "means for" in these instances can include (but is not limited to) using any suitable component discussed herein, along with any suitable software, circuitry, hub, computer code, logic, algorithms, hardware, controller, interface, link, bus, communication pathway, etc.

What is claimed is:

1. A method to be performed by a processor that detects objects, the method comprising:
   generating feature block components representing an image frame, wherein the image frame is partitioned into feature block rows, such that each feature block row has associated feature block components; and
   for each detector window:
      using feature block components of feature block rows overlapped by the detector window to determine a vector dot product associated with the detector window, wherein each feature block component is moved once from an external memory to an internal memory, and classifying an image frame portion corresponding with the detector window as an object or non-object based on the vector dot product.

2. The method of claim 1, further comprising:

for each feature block row, evaluating feature block components associated with the feature block row to determine a partial vector dot product for each detector window that overlaps a portion of the image frame that includes the feature block row, such that each detector window has an associated group of partial vector dot products.

3. The method of claim 2, wherein the determining the partial vector dot product includes, for each detector window that overlaps the portion of the image frame that includes the feature block row:

determining a partial feature vector associated with the detector window from feature block components for the feature block row that are overlapped by the detector window; and combining the partial feature vector with a partial hyperlane vector of a hyperplane associated with the detector window.

4. The method of claim 1, further comprising, for each detector window, defining a vector dot product table that includes an entry for each position of the detector window within the image frame.

5. The method of claim 4, further comprising updating the entry each time a partial vector dot product is determined for the detector window.

6. The method of claim 4, further comprising using the vector dot product table for analyzing multiple image frames.

7. The method of claim 1, wherein the defining the vector dot product table includes storing the vector dot product table in internal memory.

8. The method of claim 1, wherein the generating the feature block components includes generating histogram of oriented gradient (HOG) descriptors representing the image frame.

9. The method of claim 1, wherein the classifying the image frame portion corresponding with the detector window based on the vector dot product includes combining the vector dot product associated with the detector window with vector dot products associated with the detector window and successively analyzed image frames.

10. A non-transitory media encoded with logic that includes code for execution and, when executed by a processor that performs object detection, operable to perform operations comprising:

generating feature block components representing an image frame, wherein the image frame is partitioned into feature block rows, such that each feature block row has associated feature block components; and for each detector window:

using feature block components of feature block rows overlapped by the detector window to determine a vector dot product associated with the detector window, wherein each feature block component is moved once from an external memory to an internal memory, and classifying an image frame portion corresponding with the detector window as an object or non-object based on the vector dot product.

11. The non-transitory media of claim 10, further comprising, for each detector window, defining a vector dot product table that includes an entry for each position of the detector window within the image frame.

12. The non-transitory media of claim 11, further comprising updating the entry each time a partial vector dot product is determined for the detector window.

13. The non-transitory media of claim 10, further comprising:

for each feature block row, evaluating feature block components associated with the feature block row to determine a partial vector dot product for each detector window that overlaps a portion of the image frame that includes the feature block row, such that each detector window has an associated group of partial vector dot products.

14. The non-transitory media of claim 13, wherein the determining the partial vector dot product includes, for each detector window that overlaps the portion of the image frame that includes the feature block row:

determining a partial feature vector associated with the detector window from feature block components for the feature block row that are overlapped by the detector window; and combining the partial feature vector with a partial hyperlane vector of a hyperplane associated with the detector window.

15. An apparatus for performing object detection, the apparatus comprising:

a processor coupled to an internal memory and an external memory, wherein the processor includes an object detection module configured to perform an object detection and classification process that minimizes data transfer between the internal memory and external memory, wherein the object detection module is configured to:

generate feature block components representing an image frame, wherein the image frame is partitioned into feature block rows, such that each feature block row has associated feature block components; and for each detector window:

use feature block components of feature block rows overlapped by the detector window to determine a vector dot product associated with the detector window, wherein each feature block component is moved once from the external memory to the internal memory, and classify an image frame portion corresponding with the detector window as an object or non-object based on the vector dot product.

16. The apparatus of claim 15, wherein the object detection module includes a support vector machine (SVM) classifier that performs the classifying.

17. The apparatus of claim 15, wherein the object detection module is further configured to:

for each feature block row, evaluate feature block components associated with the feature block row to determine a partial vector dot product for each detector window that overlaps a portion of the image frame that includes the feature block row, such that each detector window has an associated group of partial vector dot products.

18. The apparatus of claim 15, wherein the processor includes a direct memory access (DMA) system that moves the feature block components from the internal memory to the external memory.

19. A method to be performed by a processor that detects objects, wherein the processor is coupled with an internal memory and an external memory, the method comprising:

generating feature block components representing an image frame, wherein the image frame is partitioned into feature block rows, such that each feature block row has associated feature block components;

for a feature block row, moving feature block components associated with the feature block row from the external memory to the internal memory;

for each detector window overlapping the feature block row, using feature block components overlapped by the detector window to determine a vector dot product associated with the detector window;

repeating the moving and determining until each feature block row is moved from external memory to internal memory; and classifying an image frame portion corresponding with a detector window as an object or non-object based on the vector dot product associated with the detector window.

20. The method of claim 19, wherein the using feature block components overlapped by the detector window to determine the vector dot product includes determining a partial vector dot product for the detector window that overlaps a portion of the image frame that includes the feature block row, wherein the detector window has an associated group of partial vector dot products.

21. The method of claim 20, wherein determining the partial dot product for the detector window includes:

determining a partial feature vector associated with the detector window from feature block components for the feature block row that are overlapped by the detector window; and combining the partial feature vector with a partial hyperlane vector of a hyperplane associated with the detector window.

22. The method of claim 19, further comprising, for each detector window, defining a vector dot product table that includes an entry for each position of the detector window within the image frame.

23. The method of claim 22, further comprising updating the entry each time a partial vector dot product is determined for the detector window.

* * * * *